(12) United States Patent
Chen et al.

(10) Patent No.: US 8,965,442 B2
(45) Date of Patent: Feb. 24, 2015

(54) UPLINK POWER CONTROL IN AGGREGATED CARRIER COMMUNICATION SYSTEMS

(75) Inventors: Wanshi Chen, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 895 days.

(21) Appl. No.: 13/101,896

(22) Filed: May 5, 2011

(65) Prior Publication Data

US 2011/0275403 A1 Nov. 10, 2011

Related U.S. Application Data

(60) Provisional application No. 61/332,612, filed on May 7, 2010.

(51) Int. Cl.
*H04W 52/30* (2009.01)
*H04W 52/14* (2009.01)
*H04W 52/32* (2009.01)
*H04W 52/34* (2009.01)
*H04W 52/16* (2009.01)
*H04W 52/28* (2009.01)
*H04W 52/36* (2009.01)

(52) U.S. Cl.
CPC .......... *H04W 52/146* (2013.01); *H04W 52/325* (2013.01); *H04W 52/346* (2013.01); *H04W 52/16* (2013.01); *H04W 52/281* (2013.01); *H04W 52/367* (2013.01); *H04W 52/34* (2013.01)
USPC ......................................................... 455/522

(58) Field of Classification Search
None
See application file for complete search history.

(56) References Cited

U.S. PATENT DOCUMENTS

| 8,285,319 | B2 | 10/2012 | Shin et al. | |
| 2012/0224535 | A1* | 9/2012 | Kim et al. | 370/328 |

FOREIGN PATENT DOCUMENTS

| EP | 1942611 A2 | 7/2008 |
| KR | 100376750 B1 | 6/2003 |
| KR | 20080064754 A | 7/2008 |
| KR | 20090097193 A | 9/2009 |

OTHER PUBLICATIONS

CATT: "Further considerations on LTE-A uplink power control", 3GPP Draft; R1-101762, 3rd Generation Partnership Project (3GPP), Mobile Competence Centre ; 650, Route Des Lucioles ; F-06921 Sophia-Antipolis Cedex ; France, vol. RAN WG1, no. Beijing, china; 20100412, Apr. 6, 2010, XP050419171, [retrieved on Apr. 6, 2010].
International Search Report and Written Opinion—PCT/US2011/035625—ISA/EPO—Oct. 12, 2011.

(Continued)

*Primary Examiner* — Philip Sobutka
(74) *Attorney, Agent, or Firm* — Anthony R. Morris

(57) ABSTRACT

A user equipment (UE) is configured for carrier aggregation in a wireless communication system. The UE decodes transmit power control commands from at least one downlink control channel for at least one uplink channel, where the at least one uplink channel is to be transmitted in a component carrier of a number of component carriers. The UE compares a commanded transmit power for the at least one uplink channel with a configured maximum transmit power of the component carrier and transmits the at least one uplink channel in the component carrier.

61 Claims, 6 Drawing Sheets

(56) References Cited

OTHER PUBLICATIONS

Nokia Siemens Networks, Nokia Corporation: "Power Reduction Rule for Uplink Carrier Aggregation" 3GPP Draft; R1-101890 Power Reduction Rule for Uplink Carrier Aggregation, 3rd Generation Partnership Project (3GPP), Mobile Competence Centre ; 650, Route Des Lucioles ; F-06921 Sophia-Antipolis Cedex; France, [Online] vol. RAN WG1, no. Beijing, China; 20100412, Apr. 6, 2010, XP000002658010, Retrieved from the Internet: URL:http://www.3gpp.org/ftp/tsg_ran/wg1_rl 1/TSGRI_60b/Docs/> [retrieved on Aug. 31, 2011].

Research in Motion UK Limited: "Remaining issues on Uplink Power Control for Carrier Aggregation", 3GPP Draft; R1-100569 (Rim-Up Power Control for CA), 3rd Generation Partnership Project (3GPP), Mobile Competence Centre ; 650, Route Des Lucioles ; F-06921 Sophia-Antipolis Cedex ; France, vol. Ran WG1, no. Valencia, Spain; 20100118, Jan. 12, 2010, XP050418186, [retrieved on Jan. 12, 2010].

Samsung: "Power Scaling for UL TPC in CA", 3GPP Draft; R1-103008 Power Scaling, 3rd Generation Partnership Project (3GPP), Mobile Competence Centre ; 650, Route Des Lucioles ; F-06921 Sophia-Antipolis Cedex; France vol. RAN WG1, no. Montreal, Canada; 20100510, 2010, May 4, 2010, XP050420109, [retrieved on May 4, 2010].

3GPP TS 36.213 V8.8.0, 3rd Generation Partnership Project; Technical Specification Group Radio Access Network; Evolved Universal Terrestrial Radio Access (E-UTRA) Sep. 29.9, Release 8, pp. 9-16, URL,http://www.3gpp.org/ftp/Specs/archive/36_series/36.213/36213-880.zip.

\* cited by examiner

UPLINK POWER CONTROL IN AGGREGATED CARRIER COMMUNICATION SYSTEMS

RELATED APPLICATIONS

Claim of Priority Under 35 U.S.C. §119

The present Application for patent claims priority to Provisional Application No. 61/332,612, entitled APPARATUS AND METHOD FOR PUSCH/SRS/PUCCH POWER CONTROL, filed May 7, 2010, and assigned to the assignee hereof and hereby expressly incorporated by reference herein.

TECHNICAL FIELD

The present invention relates generally to the field of wireless communications and, in particular, to systems and methods for controlling uplink transmit power in aggregated carrier systems.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Uplink transmitter power control in a mobile communication system balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells.

In LTE Rel-8, which is a single carrier system, the transmit power of the single carrier is limited by the maximum transmit power of the UE. As a result, allocation of power among the various uplink channels and signals (e.g., PUCCH, PUSCH and SRS) is relatively straightforward.

Carrier aggregation (CA) has been proposed for LTE Advanced to aggregate two or more component carriers (CCs) per UE to support wider transmission bandwidths for greater throughput. However, no mechanism has been defined to allocate and control power across multiple uplink component carriers that accounts for the limited transmission power associated with user terminals. In particular, it is an open question as to how to allocate power for competing PUCCH, PUSCH and SRS power commands on multiple component carriers when the transmit power is limited and the power commands in aggregate may exceed the maximum transmit power of a component carrier or the maximum transmit power of the UE.

SUMMARY

Disclosed embodiments include methods, apparatus and articles of manufacture for decoding transmit power control commands from at least one downlink control channel for at least one uplink channel, where the at least one uplink channel (e.g., data/information) is to be transmitted in a component carrier of a plurality of component carriers, comparing a commanded transmit power for the at least one uplink channel with a configured maximum transmit power of the component carrier, and transmitting the at least one uplink channel in the component carrier, based on the comparison.

Other disclosed embodiments include methods, apparatus and articles of manufacture for transmitting power control commands on at least one downlink control channel for at least one uplink channel, where the at least one uplink channel is to be received in a component carrier of a plurality of component carriers and where a commanded transmit power for the at least one uplink channel may be compared by a user equipment with a configured maximum transmit power of the component carrier; and receiving the at least one uplink channel in the component carrier.

These and other features of various embodiments, together with the organization and manner of operation thereof, will become apparent from the following detailed description when taken in conjunction with the accompanying drawings, in which like reference numerals are used to refer to like parts throughout.

DETAILED DESCRIPTION

Figure 1:
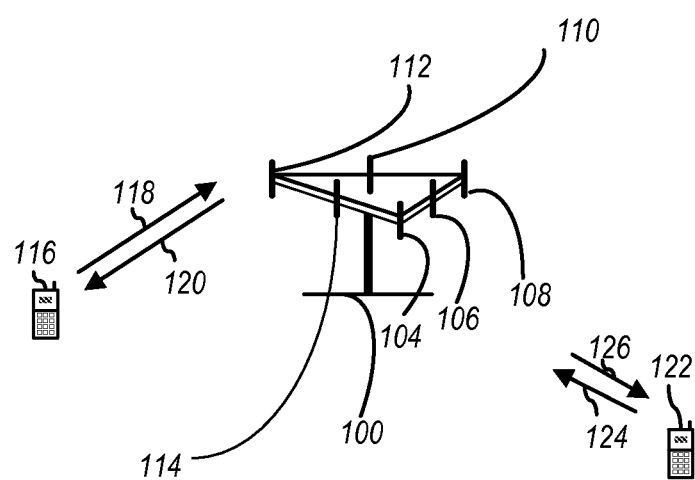
FIG. 1 illustrates a wireless communication system.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, e.g., hardware, firmware, a combination of hardware and software, software, software in execution, etc. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a tablet, a netbook, a smart book, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with wireless terminals. The communication may take place through one or more sectors. The base station can act as a router between the wireless terminal and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124, 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ (automatic repeat request) indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
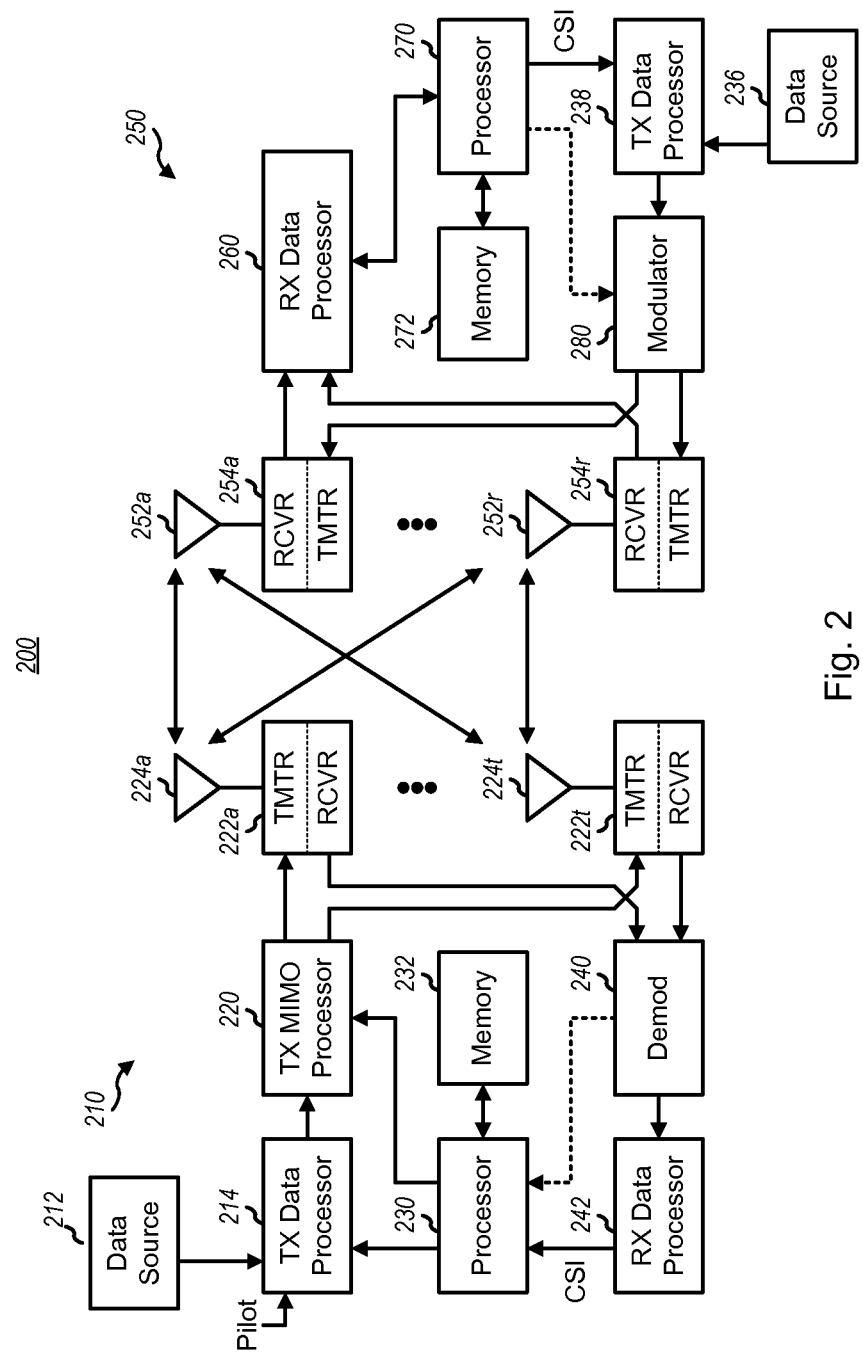
FIG. 2 illustrates a block diagram of an exemplary wireless communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further process the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink (not shown).

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas and a second data stream transmitted on the remaining two transmitter system antennas. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink (not shown).

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

In LTE Release 8, which supports single carrier operation, power control on the uplink channels (PUCCH/PUSCH/SRS) is managed with a combination of open-loop and closed-loop controls. For the Rel-8 PUSCH, transmission in subframe i is defined by:

$$P_{PUSCH}(i)=\min\{P_{CMAX}, 10\log_{10}(M_{PUSCH}(i))+P_{O\_PUSCH}(j)+\alpha(j)\cdot PL+\Delta_{TF}(i)+f(i)\}$$

where $P_{CMAX}$ is a configurable maximum total transmit power of the UE, $M_{PUSCH}(i)$ is a bandwidth factor based on the number of allocated PUSCH resource blocks in subframe (i), $P_{O\_PUSCH}(j)$ is the sum of a cell-specific nominal component provided from higher layers and a UE-specific component provided by higher layers, and (j) is a parameter indicating a semi-persistent, a dynamically scheduled resource grant or a PUSCH (re)transmission corresponding to a random access response grant. PL is a downlink path-loss estimate calculated in the UE and $\alpha(j)$ is a scaling factor provided from higher layers. The transport format parameter $\Delta_{TF}(i)$ is dependent on the modulation and coding scheme (see 3GPP TS 36.213 v8.8.0§5.1.1.1 for a description of the components of $\Delta_{TF}(i)$). The parameter f(i) is the accumulative power control (APC) command, where $$f(i)=f(i-1)+\delta_{PUSCH}(i-K_{PUSCH}),$$

and where $\delta_{PUSCH}$ is a UE specific correction value, also referred to as a transmit power control (TPC) command that is included in the PDCCH with DCI (Downlink control indicator) format 0 for a specific UE, or with DCI formats 3 and 3A for multiple UEs. $K_{PUSCH}$ is a timing offset factor associated with the PDCCH and the adjustment of the transmit power. TPC power control step sizes for the PUSCH are limited by the LTE Rel-8 specification to discrete values of −1 dB, 0 dB, +1 dB and +3 dB.

For the Rel-8 PUCCH, transmission in subframe i is defined by:

$$P_{PUCCH}(i)=\min\{P_{CMAX}, P_{0\_PUCCH}+PL+h(n_{CQI},n_{HARQ})+\Delta_{F\_PUCCH}(F)+g(i)\}$$

where $\Delta_{F\_PUCCH}$(F) is provided by higher layers and each $\Delta_{F\_PUCCH}$(F) value corresponds to a PUCCH format relative to PUCCH format 1A, h(n) is a PUCCH format dependent value where $n_{CQI}$ corresponds to the number of information bits (if any) allocated to channel quality information in the PUCCH format and $n_{HARQ}$ is the number of HARQ (hybrid automatic repeat request) bits (if any). For PUCCH format 1, 1a and 1b, $h(n_{CQI},n_{HARQ})=0$. For PUCCH format 2, 2a and 2b and normal cyclic prefix, $h(n_{CQI},n_{HARQ})=10\log_{10}(n_{CQI}/4)$ if $n_{CQI} \geq 4$; otherwise $h(n_{CQI},n_{HARQ})=0$. For PUCCH format 2 and extended cyclic prefix, $h(n_{CQI},n_{HARQ})=10\log_{10}[(n_{CQI}+n_{HARQ})/4]$ if $n_{CQI}+n_{HARQ} \geq 4$; otherwise $h(n_{CQI},n_{HARQ})=0$. $P_{0\_PUCCH}$ is a parameter composed of the sum of a cell specific parameter $P_{O\_NOMINAL\_PUCCH}$ provided by higher layers and a UE specific component $P_{O\_UE\_PUCCH}$ provided by higher layers.

The parameter g(i) is the accumulative power control command for the PUCCH, where $$g(i) = g(i-1) + \sum_{m=0}^{M-1} \delta_{PUCCH}(i-k_m),$$

where g(i) is the current PUCCH power control adjustment state, and where $\delta_{PUCCH}$ is a UE specific correction value (corresponding to $\delta_{PUCCH}$ for the PUSCH), that is included in the PDCCH with DCI formats 1A/1B/1D/1/2A/2 for a specific UE, or with DCI formats 3 and 3A for multiple UEs. Power control step sizes for the PUCCH are also limited by the LTE Rel-8 specification to discrete values of −1 dB, 0 dB, +1 dB and +3 dB.

For the Rel-8 SRS power control, transmission in subframe i is defined by:

$$P_{SRS}(i)=\min\{P_{CMAX}, P_{SRS\_OFFSET}+10\log_{10}(M_{SRS})+P_{O\_PUSCH}(j)+\alpha(j)\cdot PL+f(i)\}$$

where $P_{SRS\_OFFSET}$ is the power offset between the PUSCH and the SRS, $M_{SRS}$ is a bandwidth factor based on the number of allocated SRS resources in subframe (i), and the other parameters are as defined above.

In proposed LTE Advanced (LTE-A) systems, a user equipment (UE) may be configured for operation in a carrier aggregation (CA) environment, where the UE may transmit and receive on multiple component carriers associated with one or more serving cells (the pairing of a downlink component carrier and an uplink component carrier may be referred to herein as a "cell"). One uplink component carrier may be configured (e.g., semi-statically) by higher layers in the LTE-A system (e.g., Layer 2 or Layer 3) as the primary component carrier (PCC). All other component carriers are configured as secondary component carriers (SCC).

The PUCCH for a given UE is carried on the PCC. The PCC may carry the PUCCH and one or more PUSCH channels with or without uplink control information (UCI) in each subframe, as well as a sounding reference signal (SRS) channel. Each of the secondary component carriers may carry one or more PUSCH channels with or without UCI in each subframe, as well as an SRS channel. Uplink control information may include hybrid automatic repeat request bits (HARQ ACK/NAK bits), channel quality information (CQI) bits and scheduling request (SR) bits for requesting uplink resource grants for PUSCH transmission.

Figure 3:
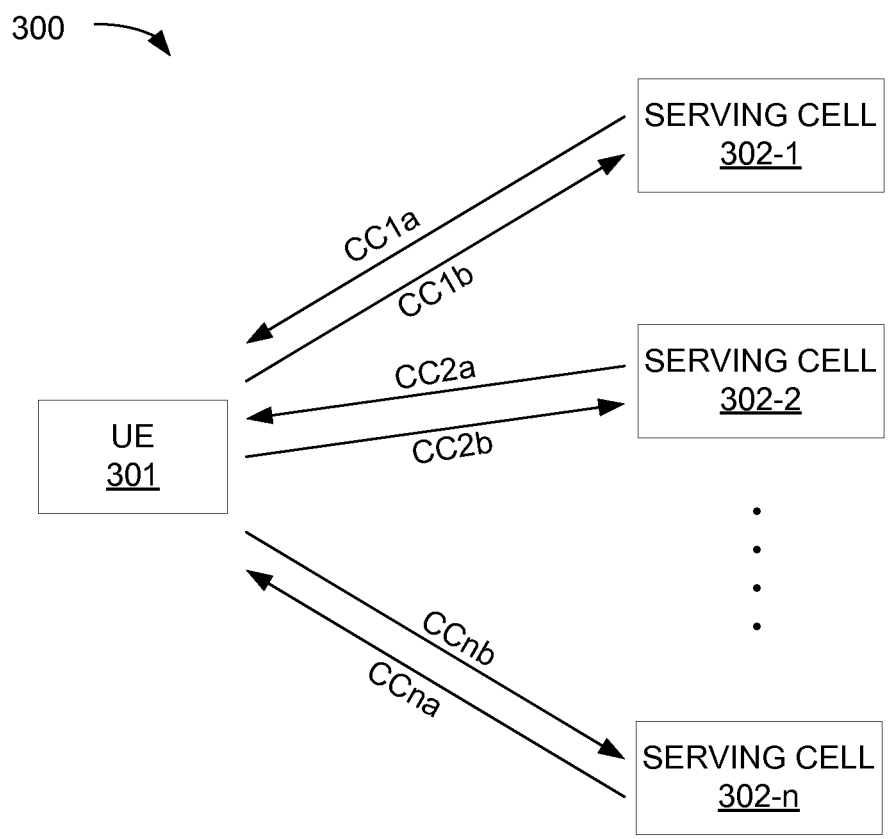
FIG. 3 is a block diagram illustrating an exemplary carrier aggregation system.

FIG. 3 is a block diagram illustrating a wireless communication system 300 with carrier aggregation. In system 300, user equipment (UE) 301 is configured to operate with multiple component carriers. UE 301 may receive downlink component carrier CC1a from serving cell 302-1 and downlink component carriers CC2a through CCna from serving cells 302-2 through 302-n, respectively. Similarly, UE 301 may transmit uplink component carriers CC1b through CCnb to serving cells 302-1 through 302-n, respectively. In one embodiment, all of the uplink and downlink component carriers may be received and transmitted by a single serving cell.

In one embodiment, a user equipment such as UE 301 may decode transmit power control commands from at least one downlink control channel (e.g., a physical downlink control channel—PDCCH) for at least one uplink channel, where the at least one uplink channel is to be transmitted in a component carrier of a plurality of component carriers. The UE may compare a commanded transmit power (e.g., power level based on transmit power commands) for the at least one uplink channel with a configured maximum transmit power of the component carrier. For example, the configured maximum transmit power for the component carrier may be a component carrier specific transmit power limit or may be a limit imposed by the maximum transmit power of the UE. The UE may then transmit the at least one uplink channel in the component carrier based on the comparison.

In one aspect, the uplink component carriers may comprise one primary component carrier (PCC) and at least one secondary component carrier (SCC).

In one aspect, the UE may be configured to allocate power to the component carrier based on a predetermined transmit priority if the commanded uplink transmit power for the component carrier exceeds the configured maximum transmit power of the UE. In one embodiment, the priority may be based on an uplink channel type. For example, a physical uplink control channel (PUCCH) on the PCC may receive the highest priority, a physical uplink shared date channel (PUSCH) with uplink control information (UCI) (PUSCH+UCI) on any component carrier may receive a second priority and a PUSCH on any component carrier may receive a third priority. Accordingly, when the total commanded transmit power in the $i^{th}$ subframe across all CCs exceeds the UE's maximum transmit power (e.g., +23 dBm), the UE may scale the total PUSCH transmit power in the $i^{th}$ subframe (e.g., in linear units) such that $$\sum_c w_c \cdot P_{PUSCH_c}(i) \le P_{CMAX} - P_{PUCCH}(i) - \sum_c P_{PUSCH+UCI}(i),$$

where $w_c$ is a uniform or weighted scaling factor for the PUSCH on component carrier c.

In LTE Advanced, a PUSCH transmission on a component carrier may be configured to contain channel quality information (CQI) without data or control information such as HARQ bits, scheduling requests (SR), pre-coding matrix indicators (PMI) and rank indicator (RI). In the case where a PUSCH transmission on a component carrier is CQI only, the PUSCH may be treated as PUSCH with UCI and prioritized over PUSCHs without UCI.

An individual uplink component carrier may have a configured maximum transmit power up to the maximum (actual or configured) transmit power of the UE, such that the maximum transmit power on the component carrier may be expressed as $\min\{P_{UE\_MAX}, P_{CMAX,c}\}$ where $P_{UE\_MAX}$ is the maximum transmit power of the UE and $P_{CMAX,c}$ is the configured maximum transmit power of the component carrier.

In one embodiment, where the UE is configured to transmit a physical uplink control channel (PUCCH) on the PCC, and where a commanded transmit power level of the PUCCH is less than the maximum power level of the UE, the UE may be configured to allocate a total power to PUSCHs (with and/or without UCI) on all of the component carriers that is equal to the difference between the maximum power level of the UE and the commanded transmit power level of the PUCCH.

In one embodiment, the allocation among the PUSCHs may be a uniform power allocation. For example, if the UE is configured with four component carriers (i.e., one PCC and 3 SCCs), and the power headroom between the maximum power of the PCC ($P_{PCC\_MAX}$) and the maximum power of the UE ($P_{UE\_MAX}$) is three (3) dB, then the 3 dB power headroom allows some additional power to be allocated to PUSCHs on the three SCCs.

In another embodiment, the difference between the maximum power of the UE and the commanded transmit power level of the PUCCH may be distributed among PUSCHs on the component carriers according to commanded power changes for the PUSCHs if the sum of the commanded power changes for the PUSCHs is less than or equal to the difference between the maximum power of the UE and the commanded transmit power level of the PUCCH. For example, if the headroom defined above is the same 3 dB and the commanded power changes for the three SCCs are +2 dB, −1 dB and +2 dB, respectively, then the commanded power changes can be addressed because the total increase is less than or equal to 3 dB.

If the sum of the commanded power changes for the PUSCHs on the component carriers is greater than the difference between the maximum power of the UE and the commanded transmit power level of the PUCCH, then the UE may be configured to scale the power difference among the plurality of component carriers in proportion to the commanded power changes for the PUSCHs on the component carriers.

The allocation of power to the PUSCHs may be further prioritized according to whether or not the PUSCHs on each component carrier include uplink control information. It will be appreciated that other allocation decisions may be implemented by the UE, based for example on channel conditions and interference levels at the UE.

The transmit power of a PUSCH on a component carrier c may be expressed as:

$$P_{PUSCHc}(i) = \min\{P_{CMAXc}(i), 10 \log_{10}(M_{PUSCH,c}(i)) + P_{O\_PUSCHc}(j) + \alpha(j) \cdot PL_c + \Delta TF_c(i) + f_c(i)\}$$

where the terms on the right side of the equation are CC-specific parameters corresponding to the single carrier case discussed above.

In one embodiment, when the transmit power of the PUSCH on a component carrier c reaches the configured maximum transmit power $P_{CMAXc}(i)$ of the component carrier c in subframe i, the APC parameter $f_c(i)$ may be frozen to prevent further power increases.

In one embodiment, when the transmit power of the UE reaches the configured maximum transmit power ($P_{UE\_MAX}$), the APC parameter $f_c(i)$ may be frozen to prevent further power increases.

In one embodiment, when one or more component carriers reaches its configured maximum transmit power, any remaining power headroom, between the maximum transmit power of the UE ($P_{UE\_MAX}$) and the total transmit power of all of the frozen PUSCHs, may be allocated among any other PUSCHs on other component carriers according to any of the methods described above.

It will be appreciated that the same APC parameter used to calculate PUSCH transmit power may also be used for SRS power control on the same component carrier according to:

$$P_{SRSc}(i) = \min\{P_{CMAXc}(i), P_{SRS\_OFFSETc} + 10 \log_{10}(M_{SRSc}) + P_{O\_PUSCHc}(j) + \alpha(j) \cdot PL_c \alpha f_c(i)\}$$

If the APC parameters $f_c(i)$ are frozen to prevent increases in a PUSCH on one or more component carriers c, then the transmit power level of the corresponding SRSs may be frozen at a low power level due to the SRS offset parameter $P_{SRS\_OFFSET}$. In one embodiment, if the transmit power level of one or more component carriers is frozen, the UE may be configured to adjust the SRS offset parameter $P_{SRS\_OFFSET}$ for the corresponding component carrier in order to increase the SRS power level.

In one embodiment, if the PUSCH APC parameter is frozen across all component carriers, and the number of component carriers with SRS is fewer than the total number of component carriers, the adjustment of the offset may be based on a functional relationship between the number of CCs with frozen PUSCHs ($N_{PUSCH}$) and the number of CCs with SRSs ($N_{SRS}$). As an example, when the ratio of $N_{PUSCH}$ and $N_{SRS}$ is 2, the offset may be increased by 3 dB.

In the case of the PUCCH, the APC command g(i) for the primary component carrier is driven by the PUCCH format and the number of CQI, HARQ, and SR bits. In one embodiment, g(i) may be frozen when the transmit power of the PCC reaches the maximum power of the UE. In another embodiment, g(i) may be frozen when the transmit power of the PCC reaches a specified maximum power for the PCC.

It is possible that a UE may receive power control commands from two or more downlink control information (DCI) formats on one or more PDCCHs for a same uplink channel in a subframe. As an example, the multiple power control commands may come from different component carriers in a same subframe. In one embodiment, the commands from DCI format 0 may be prioritized over the commands from DCI format 3/3A as specified in LTE Rel-8.

In one embodiment, if the UE decodes power control commands from two or more downlink control information (DCI) formats for a same uplink channel in a subframe, the UE may be configured to average the power control commands and adjust the uplink channel in the subframe by the average.

In another aspect, if the UE decodes power control commands from two or more DCI formats for a same uplink channel in a subframe, the UE may be configured to sum all of the power-up and power-down commands for the two or more DCI formats and to adjust the uplink channel in the subframe by the sum.

In another aspect, if the UE decodes power control commands from two or more DCI formats, the UE may be configured to prioritize the commands according to component carrier type and command type. For example, the order of prioritization could be DCI from the PCC and then DCI from SCCs in some predetermined order, then format 3/3A commands on PCC followed format 3/3A commands from the SCCs in some predetermined order.

In one embodiment, the UE may be configured to decode power control information for all of the component carriers from a power control field in only one downlink component carrier (e.g., the PCC), wherein the UE (in cooperation with the serving cells) may be configured to use control bits from DCI in other downlink component carriers, which would otherwise be allocated to power control, for other purposes (e.g., ACK/NAK or CRC).

In another aspect of carrier aggregation in a wireless communication system, a serving cell (e.g., eNodeB) or multiple serving cells may be configured to transmit power control commands on at least one downlink control channel for at least one uplink channel, where the at least one uplink channel is to be received in a component carrier of a plurality of component carriers, where a commanded transmit power for the at least one uplink channel may be compared by a user equipment with a configured maximum transmit power of the component carrier, wherein the serving cell may then receive the at least one uplink channel in the component carrier.

Figure 4:
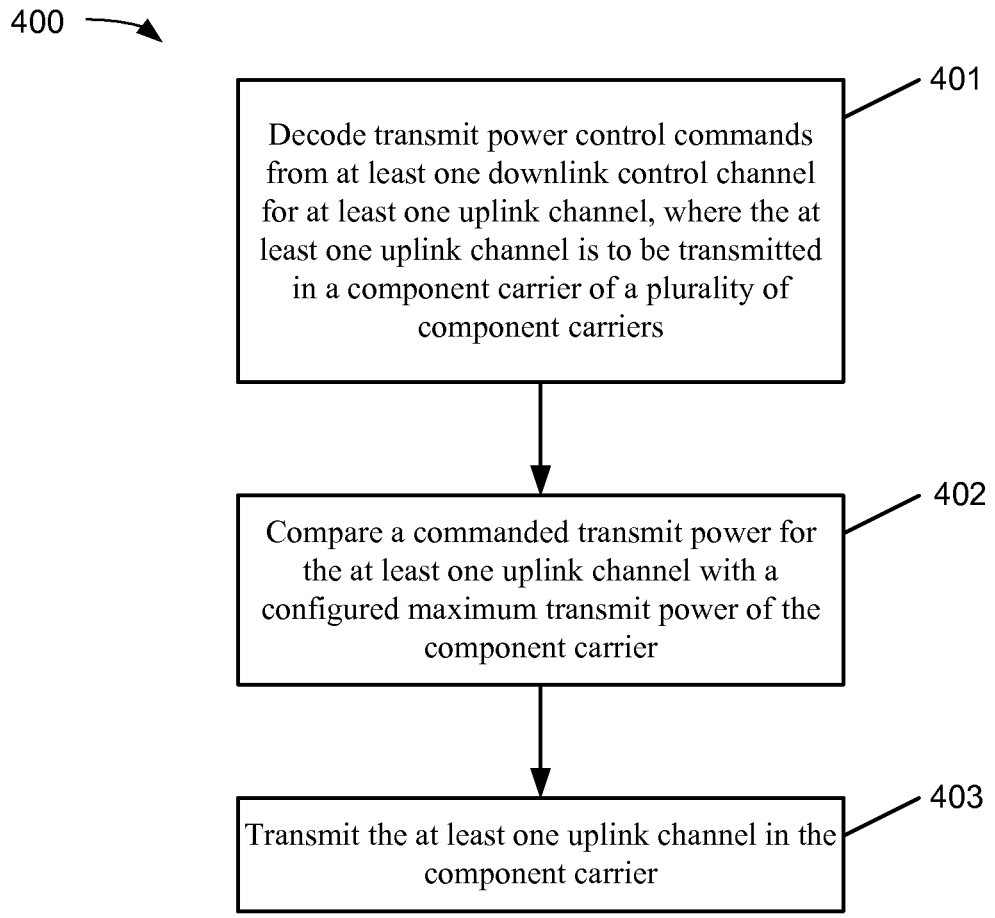
FIG. 4 is a flowchart illustrating an exemplary method.

FIG. 4 is a flowchart 400 illustrating an exemplary method in a user equipment. The method begins at operation 401 where the UE decodes transmit power control commands from at least one downlink control channel for at least one uplink channel, where the at least one uplink channel is to be transmitted in a component carrier of the plurality of component carriers. The method continues at operation 402, where the UE compares a commanded transmit power for the at least one uplink channel with a configured maximum transmit power of the component carrier. The method concludes at operation 403, where the UE transmits the at least one uplink channel in the component carrier.

Figure 5:
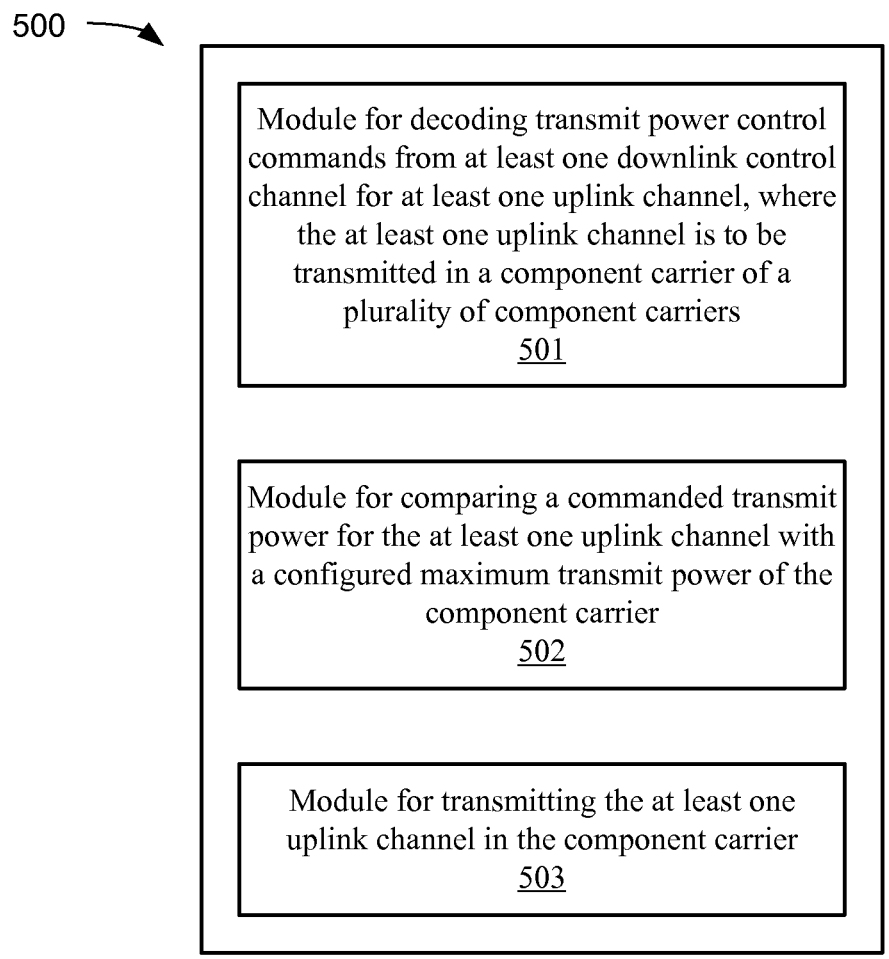
FIG. 5 is a functional block diagram illustrating an exemplary user equipment.

FIG. 5 is a functional block diagram illustrating a user equipment 500 capable of supporting the various operations and embodiments described herein. User equipment 500 includes a module 501 for decoding transmit power control commands from at least one downlink control channel for at least one uplink channel, where the at least one uplink channel is to be transmitted in a component carrier of the plurality of component carriers. User equipment 500 also includes a module 502 for comparing a commanded transmit power for the at least one uplink channel with a configured maximum transmit power of the component carrier. User equipment 500 also includes a module 503 for transmitting the at least one uplink channel in the component carrier.

Figure 6:
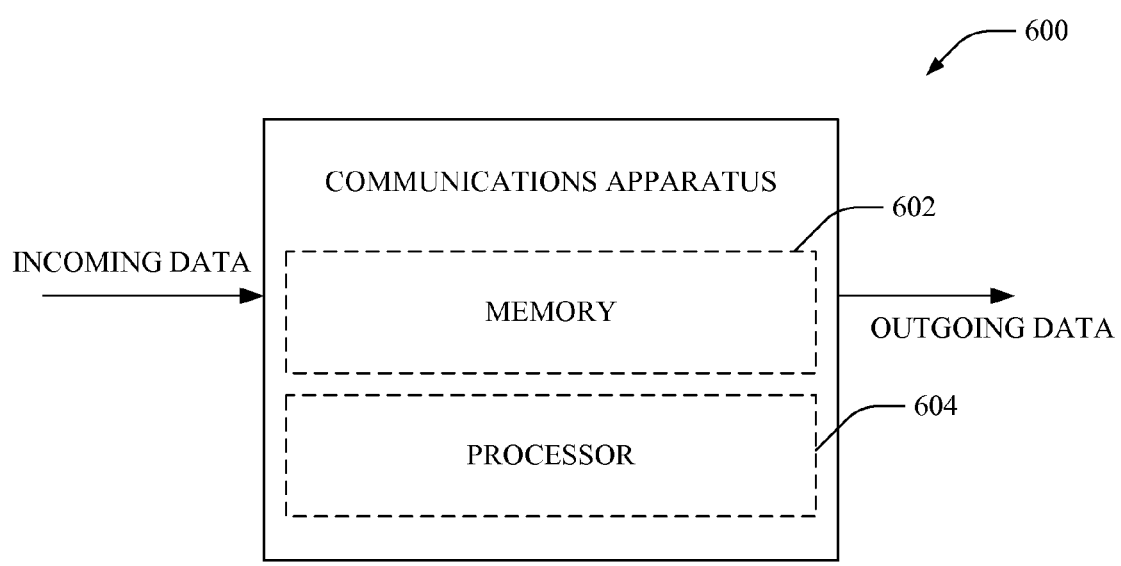
FIG. 6 is an exemplary apparatus capable of implementing various embodiments.

FIG. 6 illustrates a communications apparatus 600 within which the various disclosed embodiments may be implemented. In particular, the apparatus 600 that is shown in FIG. 6 may comprise at least a portion of serving cell such as serving cells 302 illustrated in FIG. 3 and/or at least a portion of a user equipment such as UE 301 illustrated in FIG. 3 and/or at least a portion of a transmitter system or a receiver system such as the transmitter system 210 and the receiver system 250 that are depicted in FIG. 2. The apparatus 600 that is depicted in FIG. 6 can be resident within a wireless network and receive incoming data via, for example, one or more receivers and/or the appropriate reception and decoding circuitry (e.g., antennas, transceivers, demodulators and the like). The apparatus 600 that is depicted in FIG. 6 can also transmit outgoing data via, for example, one or more transmitters and/or the appropriate encoding and transmission circuitry (e.g., antennas, transceivers, modulators and the like). Additionally, or alternatively, the apparatus 600 that is depicted in FIG. 6 may be resident within a wired network.

FIG. 6 further illustrates that the apparatus 600 can include a memory 602 that can retain instructions for performing one or more operations, such as signal conditioning, analysis and the like. Additionally, the apparatus 600 of FIG. 6 may include a processor 604 that can execute instructions that are stored in the memory 602 and/or instructions that are received from another device. The instructions can relate to, for example, configuring or operating the apparatus 600 or a related communications apparatus. It should be noted that while the memory 602 that is depicted in FIG. 6 is shown as a single block, it may comprise two or more separate memories that constitute separate physical and/or logical units. In addition, the memory while being communicatively coupled to the processor 604, may reside fully or partially outside of the apparatus 600 that is depicted in FIG. 6. Memory 602 may also reside fully or partially inside of processor 604. It is also to be understood that one or more components, such as the serving cells 302 depicted in FIG. 3 can exist within a memory such as memory 602.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 600 of FIG. 6 can be employed as a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment may access the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to include a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing, containing, and/or carrying instruction(s) and/or data, such as a computer readable medium. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method in a user equipment (UE) configured with a plurality of component carriers, comprising:
   decoding transmit power control commands from at least one downlink control channel for at least one uplink channel, wherein the at least one uplink channel is to be transmitted in a component carrier of the plurality of component carriers;
   comparing a commanded transmit power for the at least one uplink channel with a configured maximum transmit power of the component carrier; and
   transmitting the at least one uplink channel in the component carrier,
   wherein the transmission of the at least one uplink channel is based on a transmit priority among the plurality of component carriers when a total commanded transmit power exceeds a configured maximum transmit power of the UE.

2. The method of claim 1, wherein the plurality of component carriers comprises a primary component carrier (PCC) and at least one secondary component carrier (SCC).

3. The method of claim 1, wherein the transmit priority is based on an uplink channel type, wherein a physical uplink control channel (PUCCH) has a first priority, wherein a physical uplink shared data channel (PUSCH) with uplink control information (UCI) has a second priority, and wherein a PUSCH without UCI has a third priority.

4. The method of claim 3, wherein a channel quality information (CQI)-only PUSCH transmission has equal priority as a PUSCH with UCI transmission.

5. The method of claim 2, wherein the UE is configured to transmit a physical uplink control channel (PUCCH) on the PCC, and wherein when a commanded transmit power level of the PUCCH is less than a maximum power level of the UE, the method further comprising allocating a total power to PUSCHs on the plurality of component carriers equal to a difference between the maximum power level of the UE and the commanded transmit power level of the PUCCH.

6. The method of claim 5, wherein the power allocated to the PUSCHs is uniformly distributed among the plurality of component carriers.

7. The method of claim 2, wherein the UE is configured to transmit a physical uplink control channel (PUCCH) on the PCC, wherein the UE is further configured to transmit a physical uplink shared data channel (PUSCH) with uplink control information (UCI) on the plurality of component carriers, wherein when a commanded transmit power level of the PUCCH plus a commanded power level of the PUSCH with UCI is less than a maximum power level of the UE, the method further comprising allocating a total power to PUSCHs on the plurality of component carriers without UCI equal to a difference between the maximum power level of the UE and the commanded transmit power levels of the PUCCH plus the commanded power levels of the PUSCH with UCI.

8. The method of claim 7, wherein the power allocated to the PUSCHs on the plurality of component carriers is uniformly distributed among the plurality of component carriers.

9. The method of claim 1, further comprising freezing an accumulative power control (APC) parameter for a PUSCH on the component carrier when the transmit power of the PUSCH reaches the configured maximum transmit power of the component carrier.

10. The method of claim 9, further comprising applying a power offset to a power level of a sounding reference signal (SRS) on the component carrier when the APC parameter is frozen, wherein the SRS power level is increased.

11. The method of claim 10, wherein the power offset of the SRS is applied based at least in part on a ratio of a number of component carriers with SRS to a number of component carriers with PUSCH.

12. The method of claim 2, further comprising freezing an accumulative power control (APC) parameter for a PUCCH on the PCC when a transmit power of the PUCCH reaches a configured maximum transmit power of the PCC.

13. The method of claim 3, wherein the PUSCH with UCI consists of channel status information (CSI) feedback via PUSCH without uplink data transmission.

14. The method of claim 1, wherein the UE decodes power control commands from two or more downlink control information (DCI) formats for a same uplink channel in a subframe, the method further comprising prioritizing the commands from DCI format 0 over the commands from DCI format 3/3A.

15. The method of claim 1, wherein the UE decodes power control commands from two or more downlink control information (DCI) formats for a same uplink channel in a subframe, the method further comprising averaging the power control commands and adjusting the uplink channel in the subframe by the average.

16. The method of claim 1, wherein the UE decodes power control commands from two or more DCI formats for a same uplink channel in a subframe, the method further comprising summing power-up and power-down commands from the two or more DCI formats and adjusting the uplink channel in the subframe by the sum.

17. The method of claim 2, wherein the UE decodes power control commands from two or more DCI formats, the method further comprising prioritizing a power control command from a DCI format from the PCC over a power control command from a DCI format from any SCC, and prioritizing the commands from DCI format 0 over the commands from DCI format 3/3A.

18. A method in a user equipment (UE) configured with a plurality of component carriers, comprising:
decoding transmit power control commands from at least one downlink control channel for at least one uplink channel, wherein the at least one uplink channel is to be transmitted in a component carrier of the plurality of component carriers, wherein the plurality of component carriers comprises a primary component carrier (PCC) and at least one secondary component carrier (SCC);
applying power control commands decoded from the PCC to the PUCCH and interpreting power control bits from the SCCs for an alternative use; and
transmitting the at least one uplink channel in the component carrier.

19. An article of manufacture, comprising a non-transitory machine-readable medium having instructions therein that, when executed by a machine, configure the machine to:
decode transmit power control commands from at least one downlink control channel for at least one uplink channel, wherein the at least one uplink channel is to be transmitted in a component carrier of the plurality of component carriers;
compare a commanded transmit power for the at least one uplink channel with a configured maximum transmit power of the component carrier; and
transmit the at least one uplink channel in the component carrier,
wherein the transmission of the at least one uplink channel is based on a transmit priority among the plurality of component carriers when a total commanded transmit power exceeds a configured maximum transmit power of the UE.

20. The article of manufacture of claim 19, wherein the plurality of component carriers comprises a primary component carrier (PCC) and at least one secondary component carrier (SCC).

21. The article of manufacture of claim 19, wherein the transmit priority is based on an uplink channel type, wherein a physical uplink control channel (PUCCH) has a first priority, wherein a physical uplink shared data channel (PUSCH) with uplink control information (UCI) has a second priority, and wherein a PUSCH without UCI has a third priority.

22. The article of manufacture of claim 21, wherein a channel quality information (CQI)-only PUSCH transmission has equal priority as a PUSCH with UCI transmission.

23. The article of manufacture of claim 19, wherein the UE is configured to transmit a physical uplink control channel (PUCCH) on the PCC, and wherein when a commanded transmit power level of the PUCCH is less than a maximum power level of the UE, wherein the machine is further configured to allocate a total power to PUSCHs on the plurality of component carriers equal to a difference between the maximum power level of the UE and the commanded transmit power level of the PUCCH.

24. The article of manufacture of claim 19, wherein the UE is configured to transmit a physical uplink control channel (PUCCH) on the PCC, wherein the UE is further configured to transmit a physical uplink shared data channel (PUSCH) with uplink control information (UCI) on the plurality of component carriers, wherein when a commanded transmit power level of the PUCCH plus a commanded power level of the PUSCH with UCI is less than a maximum power level of the UE, wherein the machine is further configured to allocate a total power to PUSCHs on the plurality of component carriers without UCI equal to a difference between the maximum power level of the UE and the commanded transmit power levels of the PUCCH plus the commanded power levels of the PUSCH with UCI.

25. The article of manufacture of claim 19, wherein the machine is further configured to freeze an accumulative power control (APC) parameter for a PUSCH on the component carrier when the transmit power of the PUSCH reaches the configured maximum transmit power of the component carrier.

26. The article of manufacture of claim 25, wherein the machine is further configured to apply a power offset to a power level of a sounding reference signal (SRS) on the component carrier when the APC parameter is frozen, wherein the SRS power level is increased.

27. The article of manufacture of claim 20, wherein the machine is further configured to freeze an accumulative power control (APC) parameter for a PUCCH on the PCC when a transmit power of the PUCCH reaches a configured maximum transmit power of the PCC.

28. The article of manufacture of claim 19, wherein the UE decodes power control commands from two or more downlink control information (DCI) formats for a same uplink channel in a subframe, wherein the machine is further configured to prioritize the commands from DCI format 0 over the commands from DCI format 3/3A.

29. The article of manufacture of claim 19, wherein the UE decodes power control commands from two or more downlink control information (DCI) formats for a same uplink channel in a subframe, wherein the machine is further configured to average the power control commands and to adjust the uplink channel in the subframe by the average.

30. The article of manufacture of claim 19, wherein the UE decodes power control commands from two or more DCI formats for a same uplink channel in a subframe, wherein the machine is further configured to sum power-up and power-down commands from the two or more DCI formats and to adjust the uplink channel in the subframe by the sum.

31. The article of manufacture of claim 20, wherein the UE decodes power control commands from two or more DCI formats, wherein the machine is further configured to prioritize a power control command from a DCI format from the PCC over a power control command from a DCI format from any SCC, and to prioritize the commands from DCI format 0 over the commands from DCI format 3/3A.

32. An apparatus, comprising:
a processor; and
a memory comprising processor executable instructions that, when executed by the processor, configures the apparatus to:
decode transmit power control commands from at least one downlink control channel for at least one uplink channel,
wherein the at least one uplink channel is to be transmitted in a component carrier of the plurality of component carriers;
compare a commanded transmit power for the at least one uplink channel with a configured maximum transmit power of the component carrier; and
transmit the at least one uplink channel in the component carrier,
wherein the transmission of the at least one uplink channel is based on a transmit priority among the plurality of component carriers when a total commanded transmit power exceeds a configured maximum transmit power of the UE.

33. The apparatus of claim 32, wherein the plurality of component carriers comprises a primary component carrier (PCC) and at least one secondary component carrier (SCC).

34. The apparatus of claim 32, wherein the transmit priority is based on an uplink channel type, wherein a physical uplink control channel (PUCCH) has a first priority, wherein a physical uplink shared data channel (PUSCH) with uplink control information (UCI) has a second priority, and wherein a PUSCH without UCI has a third priority.

35. The apparatus of claim 34, wherein a channel quality information (CQI)-only PUSCH transmission has equal priority as a PUSCH with UCI transmission.

36. The apparatus of claim 33, wherein the UE is configured to transmit a physical uplink control channel (PUCCH) on the PCC, and wherein when a commanded transmit power level of the PUCCH is less than a maximum power level of the UE, wherein the processor is further configured to allocate a total power to PUSCHs on the plurality of component carriers equal to a difference between the maximum power level of the UE and the commanded transmit power level of the PUCCH.

37. The apparatus of claim 33, wherein the UE is configured to transmit a physical uplink control channel (PUCCH) on the PCC, wherein the UE is further configured to transmit a physical uplink shared data channel (PUSCH) with uplink control information (UCI) on the plurality of component carriers, wherein when a commanded transmit power level of the PUCCH plus a commanded power level of the PUSCH with UCI is less than a maximum power level of the UE, wherein the processor is further configured to allocate a total power to PUSCHs on the plurality of component carriers without UCI equal to a difference between the maximum power level of the UE and the commanded transmit power levels of the PUCCH plus the commanded power levels of the PUSCH with UCI.

38. The apparatus of claim 32, wherein the processor is further configured to freeze an accumulative power control (APC) parameter for a PUSCH on the component carrier when the transmit power of the PUSCH reaches the configured maximum transmit power of the component carrier.

39. The apparatus of claim 38, wherein the processor is further configured to apply a power offset to a power level of a sounding reference signal (SRS) on the component carrier when the APC parameter is frozen, wherein the SRS power level is increased.

40. The apparatus of claim 33, wherein the processor is further configured to freeze an accumulative power control (APC) parameter for a PUCCH on the PCC when a transmit power of the PUCCH reaches a configured maximum transmit power of the PCC.

41. The apparatus of claim 32, wherein the UE decodes power control commands from two or more downlink control information (DCI) formats for a same uplink channel in a subframe, wherein the processor is further configured to prioritize the commands from DCI format 0 over the commands from DCI format 3/3A.

42. The apparatus of claim 32, wherein the UE decodes power control commands from two or more downlink control information (DCI) formats for a same uplink channel in a subframe, wherein the processor is further configured to average the power control commands and to adjust the uplink channel in the subframe by the average.

43. The apparatus of claim 32, wherein the UE decodes power control commands from two or more DCI formats for a same uplink channel in a subframe, wherein the processor is further configured to sum power-up and power-down commands from the two or more DCI formats and to adjust the uplink channel in the subframe by the sum.

44. The apparatus of claim 33, wherein the UE decodes power control commands from two or more DCI formats, wherein the processor is further configured to prioritize a power control command from a DCI format from the PCC over a power control command from a DCI format from any SCC, and to prioritize the commands from DCI format 0 over the commands from DCI format 3/3A.

45. A apparatus configured as a user equipment (UE), comprising:
means for decoding transmit power control commands from at least one downlink control channel for at least one uplink channel, wherein the at least one uplink channel is to be transmitted in a component carrier of the plurality of component carriers;
means for comparing a commanded transmit power for the at least one uplink channel with a configured maximum transmit power of the component carrier; and
means for transmitting the at least one uplink channel in the component carrier,
wherein the transmission of the at least one uplink channel is based on a transmit priority among the plurality of component carriers when a total commanded transmit power exceeds a configured maximum transmit power of the UE.

46. The apparatus of claim 45, wherein the plurality of component carriers comprises a primary component carrier (PCC) and at least one secondary component carrier (SCC).

47. The apparatus of claim 45, wherein the transmit priority is based on an uplink channel type, wherein a physical uplink control channel (PUCCH) has a first priority, wherein a physical uplink shared data channel (PUSCH) with uplink control information (UCI) has a second priority, and wherein a PUSCH without UCI has a third priority.

48. The apparatus of claim 47, wherein a channel quality information (CQI)-only PUSCH transmission has equal priority as a PUSCH with UCI transmission.

49. The apparatus of claim 46, wherein the UE is configured to transmit a physical uplink control channel (PUCCH) on the PCC, and wherein when a commanded transmit power level of the PUCCH is less than a maximum power level of the UE, the apparatus further comprising means for allocating a total power to PUSCHs on the plurality of component carriers equal to a difference between the maximum power level of the UE and the commanded transmit power level of the PUCCH.

50. The apparatus of claim 46, wherein the UE is configured to transmit a physical uplink control channel (PUCCH) on the PCC, wherein the UE is further configured to transmit a physical uplink shared data channel (PUSCH) with uplink control information (UCI) on the plurality of component carriers, wherein when a commanded transmit power level of the PUCCH plus a commanded power level of the PUSCH with UCI is less than a maximum power level of the UE, the apparatus further comprising means for allocating a total power to PUSCHs on the plurality of component carriers without UCI equal to a difference between the maximum power level of the UE and the commanded transmit power levels of the PUCCH plus the commanded power levels of the PUSCH with UCI.

51. The apparatus of claim 45, further comprising means for freezing an accumulative power control (APC) parameter for a PUSCH on the component carrier when the transmit power of the PUSCH reaches the configured maximum transmit power of the component carrier.

52. The apparatus of claim 51, further comprising means for applying a power offset to a power level of a sounding reference signal (SRS) on the component carrier when the APC parameter is frozen, wherein the SRS power level is increased.

53. The apparatus of claim 46, further comprising means for freezing an accumulative power control (APC) parameter for a PUCCH on the PCC when a transmit power of the PUCCH reaches a configured maximum transmit power of the PCC.

54. The apparatus of claim 45, wherein the UE decodes power control commands from two or more downlink control information (DCI) formats for a same uplink channel in a subframe, the apparatus further comprising means for prioritizing the commands from DCI format 0 over the commands from DCI format 3/3A.

55. The apparatus of claim 45, wherein the UE decodes power control commands from two or more downlink control information (DCI) formats for a same uplink channel in a subframe, the apparatus further comprising means for averaging the power control commands and means for adjusting the uplink channel in the subframe by the average.

56. The apparatus of claim 45, wherein the UE decodes power control commands from two or more DCI formats for a same uplink channel in a subframe, the apparatus further comprising means for summing power-up and power-down commands from the two or more DCI formats and means for adjusting the uplink channel in the subframe by the sum.

57. The apparatus of claim 46, wherein the UE decodes power control commands from two or more DCI formats, the apparatus further comprising means for prioritizing a power control command from a DCI format from the PCC over a power control command from a DCI format from any SCC, and means for prioritizing the commands from DCI format 0 over the commands from DCI format 3/3A.

58. A method in a serving cell, comprising:
transmitting power control commands on at least one downlink control channel for at least one uplink channel, wherein the at least one uplink channel is to be received in a component carrier of a plurality of component carriers,
wherein a commanded transmit power for the at least one uplink channel is to be compared by a user equipment with a configured maximum transmit power of the component carrier; and
receiving the at least one uplink channel transmitted from the user equipment in the component carrier,
wherein the transmission of the at least one uplink channel from the user equipment is based on a transmit priority among the plurality of component carriers when a total commanded transmit power exceeds a configured maximum transmit power of the user equipment.

59. An article of manufacture, comprising a non-transitory machine-readable medium having instructions therein that, when executed by a machine, configure the machine to:
transmit power control commands on at least one downlink control channel for at least one uplink channel, wherein the at least one uplink channel is to be received in a component carrier of a plurality of component carriers, wherein a commanded transmit power for the at least one uplink channel is to be compared by a user equipment with a configured maximum transmit power of the component carrier; and receive the at least one uplink channel transmitted from the user equipment in the component carrier, wherein the transmission of the at least one uplink channel from the user equipment is based on a transmit priority among the plurality of component carriers when a total commanded transmit power exceeds a configured maximum transmit power of the user equipment.

60. An apparatus, comprising:

a processor; and a memory comprising processor executable instructions that, when executed by the processor, configures the apparatus to:

transmit power control commands on at least one downlink control channel for at least one uplink channel, wherein the at least one uplink channel is to be received in a component carrier of a plurality of component carriers, wherein a commanded transmit power for the at least one uplink channel is to be compared by a user equipment with a configured maximum transmit power of the component carrier; and receive the at least one uplink channel transmitted from the user equipment in the component carrier, wherein the transmission of the at least one uplink channel from the user equipment is based on a transmit priority among the plurality of component carriers when a total commanded transmit power exceeds a configured maximum transmit power of the user equipment.

61. An apparatus configured as a serving cell, comprising:

means for transmitting power control commands on at least one downlink control channel for at least one uplink channel, wherein the at least one uplink channel is to be received in a component carrier of a plurality of component carriers, wherein a commanded transmit power for the at least one uplink channel is to be compared by a user equipment with a configured maximum transmit power of the component carrier; and means for receiving the at least one uplink channel transmitted from the user equipment in the component carrier, wherein the transmission of the at least one uplink channel from the user equipment is based on a transmit priority among the plurality of component carriers when a total commanded transmit power exceeds a configured maximum transmit power of the user equipment.

* * * * *